US012649123B2

(12) United States Patent
Lee

(10) Patent No.: US 12,649,123 B2
(45) Date of Patent: Jun. 9, 2026

(54) GREENHOUSE GAS TREATMENT APPARATUS

(71) Applicant: Nak Young Lee, Seongnam-si (KR)

(72) Inventor: Nak Young Lee, Seongnam-si (KR)

( * ) Notice: Subject to any disclaimer, the term of this patent is extended or adjusted under 35 U.S.C. 154(b) by 534 days.

(21) Appl. No.: 18/031,818

(22) PCT Filed: Sep. 15, 2021

(86) PCT No.: PCT/KR2021/012552
§ 371 (c)(1),
(2) Date: Apr. 13, 2023

(87) PCT Pub. No.: WO2022/085952
PCT Pub. Date: Apr. 28, 2022

(65) Prior Publication Data
US 2023/0405509 A1 Dec. 21, 2023

(30) Foreign Application Priority Data

Oct. 23, 2020 (KR) ........................ 10-2020-0138323

(51) Int. Cl.
*B01D 53/00* (2006.01)
*B01D 5/00* (2006.01)
*B01D 53/26* (2006.01)

(52) U.S. Cl.
CPC ........... *B01D 53/002* (2013.01); *B01D 5/009* (2013.01); *B01D 53/265* (2013.01);
(Continued)

(58) Field of Classification Search
CPC .. B01D 53/002; B01D 5/0003; B01D 5/0051; B01D 5/0054; B01D 5/009;
(Continued)

(56) References Cited

U.S. PATENT DOCUMENTS 7,343,759 B2 * 3/2008 Hilliard, Jr. .......... B01D 5/0036
62/48.2
12,364,950 B2 * 7/2025 Umeda .................... B01D 7/02
(Continued)

FOREIGN PATENT DOCUMENTS

JP 60172334 A * 9/1985 ................ F25J 3/00
JP 2013-512769 A 4/2013
(Continued)

OTHER PUBLICATIONS

WO-2020115847-A1 English Translation (Year: 2020).*
JP-60172334-A English Translation (Year: 1985).*
WO-2013191331-A1 English Translation (Year: 2013).*

*Primary Examiner* — Frantz F Jules
*Assistant Examiner* — Devon Moore
(74) *Attorney, Agent, or Firm* — KORUS Patent, LLC;
Seong Il Jeong

(57) ABSTRACT

A greenhouse gas treatment apparatus for stagewise condensation and collection of atmospheric gases including water vapor, nitrous oxide, and carbon dioxide. The apparatus includes a primary cooling chamber and an independent secondary cooling chamber, each supplied with low-temperature air via dedicated supply pipes, with the secondary chamber maintained at a lower temperature than the primary chamber. A condensation pipe passes sequentially through the primary and secondary cooling chambers. As suctioned air travels through the condensation pipe, water vapor is condensed and collected in the primary cooling chamber. Remaining greenhouse gases, including carbon dioxide, are subsequently condensed and collected in the secondary cooling chamber for storage in a separate tank.

2 Claims, 3 Drawing Sheets

(52) U.S. Cl.
CPC .. *B01D 2257/404* (2013.01); *B01D 2257/504* (2013.01); *B01D 2257/80* (2013.01)

(58) Field of Classification Search
CPC ............ B01D 53/265; B01D 2257/404; B01D 2257/50; B01D 2257/504; B01D 2257/80; B01D 5/0084; Y02A 40/25; F25B 1/00; F25B 1/10; F25B 9/004; F25B 19/005; F25J 1/0027; F25J 2210/80; F25J 2215/80; F25J 3/06; F25J 3/0625; F25J 3/067; F25J 3/0675; F25J 3/0665; F25J 3/08; F25J 1/0221; F25J 1/0222; F25J 1/0223; F25J 1/0224; F25J 2270/904; Y02C 20/40; Y02P 70/10; Y02P 20/151; Y02E 20/32
USPC ............................................. 62/617; 422/168
See application file for complete search history.

(56) References Cited

U.S. PATENT DOCUMENTS

| | | | |
|---|---|---|---|
| 2011/0226010 A1 | 9/2011 | Baxter | |
| 2016/0069612 A1* | 3/2016 | Conway | .................... F25J 3/08 |
| | | | 62/617 |

FOREIGN PATENT DOCUMENTS

| | | | | |
|---|---|---|---|---|
| KR | 10-1190607 B1 | 10/2012 | | |
| KR | 10-1200101 B1 | 11/2012 | | |
| KR | 10-2020-0101790 A | 8/2020 | | |
| WO | WO-03019085 A1 * | 3/2003 | ............. | F25B 41/39 |
| WO | WO-2013191331 A1 * | 12/2013 | ........... | F24F 5/0007 |
| WO | WO-2014088630 A1 * | 6/2014 | ............. | B01D 59/26 |
| WO | WO-2020115847 A1 * | 6/2020 | ............. | F25B 41/20 |

* cited by examiner

FIG. 3

GREENHOUSE GAS TREATMENT APPARATUS

TECHNICAL FIELD

The present invention relates to a greenhouse gas treatment apparatus and, more specifically, to a greenhouse gas treatment apparatus, which condenses, in stages, through heat exchange, greenhouse gases such as water vapor, nitrous oxide and carbon dioxide, which are present in the atmosphere, so as to collect each gas and store in a tank, and thus provide for a usable means.

BACKGROUND ART

In general, greenhouse gases refer to gases that serve to absorb or reflect infrared radiant heat into the earth's atmosphere and thus increase the temperature of the earth's surface, wherein all gases in which two or more different atoms are bonded correspond thereto. Gases that have a significant effect on global warming include water vapor, carbon dioxide, methane, nitrous oxide, hydrofluorocarbons, perfluorocarbons, sulfur hexafluoride, and the like.

Among the greenhouse gases, water vapor plays the most serious role in causing the natural greenhouse effect, but carbon dioxide was officially declared as the main cause of global warming in 1985 by the World Meteorological Organization (WMO) and the United Nations Environment Program (UNEP). In particular, the gas that accounts for the largest amount of greenhouse gases generated by human activities is carbon dioxide produced by burning fossil fuels.

Various types of devices are used to reduce the emission of such carbon dioxide, but conventional carbon dioxide treatment methods have problems that the energy efficiency is poor, and carbon dioxide is separated through a collector that absorbs the carbon dioxide, which is thus low in carbon dioxide separation efficiency and require more complicated processes.

As a prior art relating to greenhouse gas treatment, Korean Patent No. 10-1740614 (Title: Flue Gas Treating Apparatus Having Improved Greenhouse Gas Removal Efficiency) discloses the flue gas treating apparatus which includes: a main body receiving flue gas inside; a first treating unit firstly removing a contaminant included in the flue gas flowing into the main body; a second treating unit secondly removing the contaminant remaining in the flue gas passing through the first treating unit; a greenhouse gas treating unit connected to either the first treating unit or the second treating unit to circulate and supplying an aqueous solution to remove the contaminant and carbon dioxide included in the flue gas; an aqueous solution circulating unit connected to the one, which remains after the other among the first treating unit or the second treating unit is connected to the greenhouse gas treating unit, to circulate and supplying the aqueous solution to remove the contaminant; and a pre-treatment unit having a pre-treatment injection part which is disposed in front of the first treatment unit to remove some of the contaminants contained in the flue gas in advance and is provided at an upper portion to inject an aqueous solution.

The above-mentioned prior art is a technology for removing carbon dioxide, and is applied in a method of filtering carbon dioxide using an aqueous solution, but there is a problem that the removal efficiency of carbon dioxide by aqueous solution is not good, and management is difficult because the removal efficiency varies greatly depending on the state of the aqueous solution and the degree of contact.

DETAILED DESCRIPTION OF THE INVENTION

Technical Problem

The present invention has been devised to solve the above-mentioned problems, and therefore, an object of the present invention is to provide a greenhouse gas treatment apparatus in which water vapor, nitrous oxide, and carbon dioxide, which are the main components of greenhouse gases, are condensed so that they can be collected intensively, and each gas is liquefied and separated in stages using different liquefaction temperature to improve the collection efficiency. In particularly, if the present apparatus is used to process emissions generated by coal-fired power plants, it can make a significant contribution to the reduction of greenhouse gases.

Technical Solution

According to the present invention, there is provided a greenhouse gas treatment apparatus comprising: a primary cooling chamber filled with low-temperature air by means of a first cold air supply pipe, a secondary cooling chamber, which is formed to have a space independent of the primary cooling chamber, is filled with the low-temperature air through a second cold air supply pipe, and is maintained to have a temperature lower than that of the primary cooling chamber, and a condensation pipe in which the suctioned air is heat-exchanged, and then discharged, while sequentially passing through the primary cooling chamber and the secondary cooling chamber, and thus the water vapor included in the air is firstly condensed and collected when the suctioned air is passing through the condensation pipe in the primary cooling chamber, and the remaining carbon dioxide and other greenhouse gases are condensed and collected when the suctioned air is passing through the secondary cooling chamber.

Also, the condensation pipe in the primary cooling chamber is provided with a first liquid tank in which condensed liquid is stored, and the condensation pipe in the secondary cooling chamber is provided with a second liquid tank 500 in which the condensed liquid is stored.

Further, the primary cooling chamber and the secondary cooling chamber are further provided with a heat exchanger, which allows heat to be exchanged with each other, so that the heat in the secondary cooling chamber is transferred to the primary cooling chamber.

Further, the primary cooling chamber and the secondary cooling chamber are respectively provided with a first exhaust valve and a second exhaust valve, and the first cold air supply pipe and the second cold air supply pipe are respectively provided with a first inlet valve and a second inlet valve, so that the internal temperature and pressure of the primary cooling chamber and the secondary cooling chamber are independently adjusted by the opening and closing operations of each valve.

Further, the condensation processing pipe is provided with an air intake means at an inlet portion of the primary cooling chamber so that greenhouse gases can be sucked, and a first compression means is provided at an inlet portion of the secondary cooling chamber, and a pressure control valve is provided at a discharge portion of the secondary cooling chamber, so that the internal pressure of the condensation pipe located inside the secondary cooling chamber is adjusted by operations of the first compression means and the opening and closing the pressure control valve.

Further, the condensation pipe is further provided with a second compression means between the first compression means and the pressure control valve, so that pressure control of the condensation pipe located in the secondary cooling chamber is performed independently.

Further, the first cold air supply pipe is branched into a first branch pipe through which cold air is supplied to the inner space of the primary cooling chamber, and a second branch pipe which is supplied directly to the condensation pipe.

Further, in the secondary cooling chamber, air at the outlet of the secondary cooling chamber can be directly mixed with air at the inlet through the third cool air supply pipe and the third on-off valve.

Advantageous Effects

According to the present invention, when treating greenhouse gases, the water vapor contained in the air is separated by using the principle of being condensed in a low temperature environment without applying the existing filtering method, and gases such as carbon dioxide and nitrous oxide, which are difficult to treat in the past, are condensed and separated into individual tanks, thereby capable of effectively reducing and treating greenhouse gases.

In addition, according to the present invention, the primary cooling chamber and the secondary cooling chamber for air cooling exist separately, so that the primary cooling chamber enables water vapor to collect, and the secondary cooling chamber enables nitrous oxide and carbon dioxide to be collected step by step.

BRIEF DESCRIPTION OF THE DRAWINGS

FIG. 3 is a diagram showing a third embodiment of a greenhouse gas treatment device according to the present invention.

DETAILED DESCRIPTION OF THE EMBODIMENTS

Hereinafter, preferred embodiments of the present invention will be described in detail with reference to the accompanying drawings. Further, in describing the present invention, a detailed description for known related configurations or functions will be omitted when it is determined that the detailed description may obscure the gist of the present invention.

Figure 1:
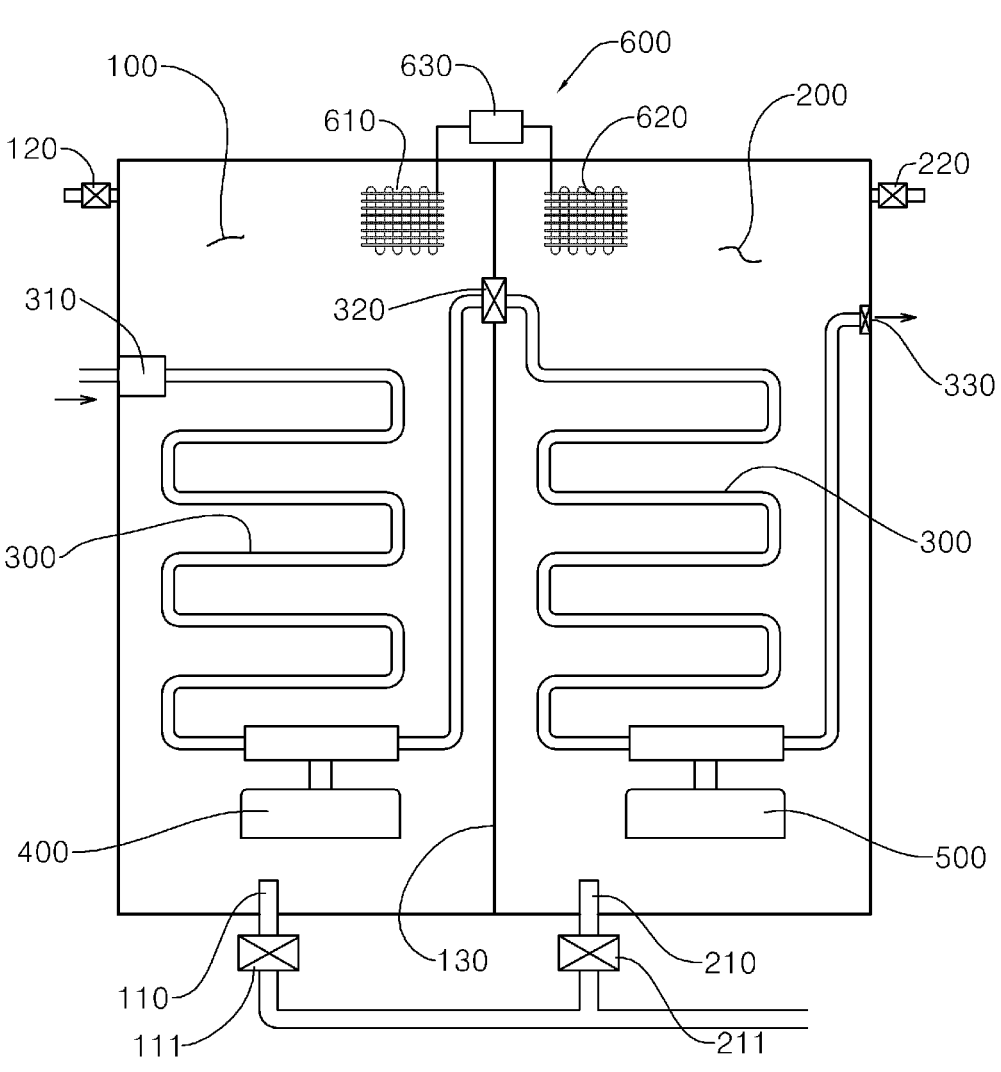
FIG. 1 is a diagram showing the basic configuration of the greenhouse gas treatment device of the present invention.

As shown in FIG. 1, the greenhouse gas treatment apparatus of the present invention includes: a primary cooling chamber 100 filled with low-temperature air by means of a first cold air supply pipe 110; a secondary cooling chamber, which is formed to have a space independent of the primary cooling chamber 100, is filled with the low-temperature air through a second cold air supply pipe 210, and is maintained to have a temperature lower than that of the primary cooling chamber 100; and a condensation pipe in which the suctioned air is heat-exchanged, and then discharged, while sequentially passing through the primary cooling chamber 100 and the secondary cooling chamber 200.

Therefore, the present invention is characterized in that the water vapor included in the air is firstly condensed and collected when the suctioned air is passing through the condensation pipe 300 in the primary cooling chamber 100, and the remaining carbon dioxide and other greenhouse gases are condensed and collected when the suctioned air is passing through the secondary cooling chamber 200.

The greenhouse gas treatment apparatus of the present invention is an apparatus for liquefying and collecting greenhouse gases, which are the main cause of global warming, and is divided into a primary cooling chamber 100 and a secondary cooling chamber 200, and consists of a condensation pipe 300 passing through the primary cooling chamber 100 and the secondary cooling chamber 200 as one line. The present invention also provides a greenhouse gas treatment apparatus in which the air suctioned through the air intake means 310 is heat-exchanged while passing through the condensation pipe 300 and passing through the primary cooling chamber 100 and the secondary cooling chamber 200, and is collected and stored in a tank when gas is condensed into liquid, wherein the apparatus has the function of collecting specific greenhouse gases in specific sections by using the property that liquefaction temperature of various greenhouse gases are different.

The primary cooling chamber 100 is maintained at a temperature sufficient to allow water vapor to condense as a liquid, and the secondary cooling chamber 200 is maintained at a temperature sufficient to allow carbon dioxide to condense as a liquid. That is, the secondary cooling chamber 200 is maintained at a lower temperature than the primary cooling chamber 100, so that even carbon dioxide that has not been removed from the primary cooling chamber 100 can be removed.

The primary cooling chamber 100 and the secondary cooling chamber 200 are preferably partitioned by a partition wall 130 as shown in the figure, rather than being formed at positions being apart from each other for energy efficiency, and the partition wall 130 is preferably applied as a partition wall 130 having a heat cutoff function so that the temperatures of the primary cooling chamber 100 and the secondary cooling chamber 200 can be independently maintained.

In addition, the primary cooling chamber 100 and the secondary cooling chamber 200 may be respectively formed on the side as shown in the figure, but a cooling chamber on either side may be configured in a shape of being located inside the other cooling chamber. The primary cooling chamber 100 and the secondary cooling chamber 200 may configure independent cooling spaces under mutually different temperature conditions.

The first cold air supply pipe 110 and the second cold air supply pipe 210 of the present invention are pipes that each supply low-temperature air to the primary cooling chamber 100 and the secondary cooling chamber 200, and each pipe can inject different amounts of low-temperature air, so that the temperatures of the primary cooling chamber 100 and the secondary cooling chamber 200 can be independently controlled.

In order to allow the present invention to work substantial effects, low-temperature air should be flowed in from the outside through the first cool air supply pipe 110 and the second cool air supply pipe 210 with higher pressure than the atmospheric pressure. If the temperature of the air being supplied to the primary cooling chamber 100 and the secondary cooling chamber 200 is high, a lot of energy is consumed in the heat exchanger 600, so that an adverse effect may occur. It is expected that the air being supplying from the outside should be about −20° C. or less and 2 bar or more.

The method related to the supply of cold air of −20° C. or less is possible if a method disclosed in Korean Patent No. 10-2054509 (Title: High-Altitude Atmospheric Energy Storage Device) disclosed by the present inventor is applied thereto, and it is possible to utilize ground air in the sufficiently cold geographical regions.

A first liquid tank 400 liquefied and stored at the temperature of above zero is connected to the condensation pipe 300 of the primary cooling chamber 100 of the present invention, and a second liquid tank 500 in which condensed liquid is stored is connected to the condensation pipe 300 of the secondary cooling chamber 200. That is, water in which water vapor is condensed is stored in the first liquid tank 400, and condensed carbon dioxide and other greenhouse gas liquids are stored in the second liquid tank 500. When the capacity of the tank reaches a full capacity, it is replaced with an empty tank, and each liquid is conveniently used for its intended purpose. In addition, the first liquid tank 400 and the second liquid tank 500 may further be provided with separate valves (not shown) for separation and replacement, respectively.

Further, when the temperature of the secondary cooling chamber 200 required for carbon dioxide condensation is difficult to maintain with only cold air flowing in through the second cool air supply pipe 210, the heat exchanger 600 can be operated to maintain the lower temperature.

The heat exchanger 600 is a device having a refrigerant cycle applied to an air conditioner or a refrigerator, and serves to lower the temperature of the secondary cooling chamber 200, wherein a compressor 630 and an expansion valve (not shown) for circulating a refrigerant may be provided between the condenser 610 and the evaporator 620.

Further, the evaporator 620, which is a component of the heat exchanger 600, is provided in the secondary cooling chamber 200, and the condenser 610 is disposed in the primary cooling chamber 610 to reduce energy consumption required for condensing a refrigerant, so that the secondary cooling chamber 200 can be cooled with high efficiency. During this process, heat in the secondary cooling chamber 200 is transferred to the primary cooling chamber 100.

When heat exchange is performed between the primary cooling chamber 100 and the secondary cooling chamber 200 via the heat exchanger 600 in this way, it is possible to set appropriate temperatures of the primary cooling chamber 100 and the secondary cooling chamber 200 while minimizing energy loss.

The temperature of the primary cooling chamber 100 is preferably maintained at 4° C. or less in order to allow the water vapor contained in the air inside the condensation pipe 300 to be condensed into water, and the temperature of the secondary cooling chamber 200 is preferably maintained lower than the minimum temperature for carbon dioxide to condense inside the condensation pipe 300, i.e., −56° C.

In addition, the present invention may include a configuration for adjusting the pressure and temperature of the primary cooling chamber 100 and the secondary cooling chamber 200 by adjusting the amount of cold air injected from the outside, respectively. That is, the primary cooling chamber 100 and the secondary cooling chamber 200 are respectively provided with a first exhaust valve 120 and a second exhaust valve 220, so that the amount of cold air injected into the primary cooling chamber 100 and the secondary cooling chamber 200 is adjusted by opening and closing each valve to independently adjust the internal temperature and pressure.

The temperature of air in the primary cooling chamber 100 can rise due to the operation of the heat exchanger 600 and heat exchange with the gas inside the condensation pipe 300. When this temperature becomes higher than the proper temperature, the first inlet valve 111 of the first cold air supply pipe 110 is opened to inject low-temperature air, and the first exhaust valve 120 is opened to discharge high-temperature air, which thus lowers the temperature.

The temperature of air in the secondary cooling chamber 200 can be maintained lower than that of cold air that has flowed in from the outside by the operation of the heat exchanger 600, and the pressure of air in the secondary cooling chamber 200 can be adjusted in a range lower than the pressure of air flowing in from the outside by adjusting the amount of low-temperature air flowing in using the second inlet valve 211 and the second exhaust valve 220.

The first cold air supply pipe 110 and the second cold air supply pipe 210 are provided in the lower part of the primary cooling chamber 100 and the secondary cooling chamber 200 by using the characteristic that hot air rises upward, and the first exhaust valve 120 and the second exhaust valve 220 are preferably provided at the upper part.

The air pressure in the primary cooling chamber 200 and the secondary cooling chamber 200 of the present invention is maintained higher than atmospheric pressure and lower than the pressure of cold air flowing in from the outside.

The condensation pipe 300 of the present invention is a passage through which the air containing greenhouse gases passes, and has a structure in which the air inside the condensation pipe 300 does not come into direct contact with the air in the primary cooling chamber 100 and the secondary cooling chamber 200, and only heat exchange is performed while passing through the interiors of the primary cooling chamber 100 and the secondary cooling chamber 200. The shape of the condensation pipe 300 is composed of a meandering path inside the primary cooling chamber 100 and the secondary cooling chamber 200 to increase heat exchange efficiency.

The condensation pipe 300 is provided with an air intake means 310 at an inlet portion of the primary cooling chamber 100, thereby allowing greenhouse gases to be suctioned. And, a first compression means 320 is provided at an inlet portion of the secondary cooling chamber 200, and a pressure control valve 330 is provided at the discharge portion of the secondary cooling chamber 200, so that the internal pressure of the condensation pipe 300 located inside the secondary cooling chamber 200 is adjusted by the opening and closing operations of the first compression means 320 and the pressure control valve 330.

Since carbon dioxide condensation performed in the secondary cooling chamber 200 is more severe than water vapor condensation performed in the primary cooling chamber 100, the pressure of the condensation pipe 300 of the secondary cooling chamber 200 is adjusted to enhance the condensation effect of carbon dioxide.

Figure 2:
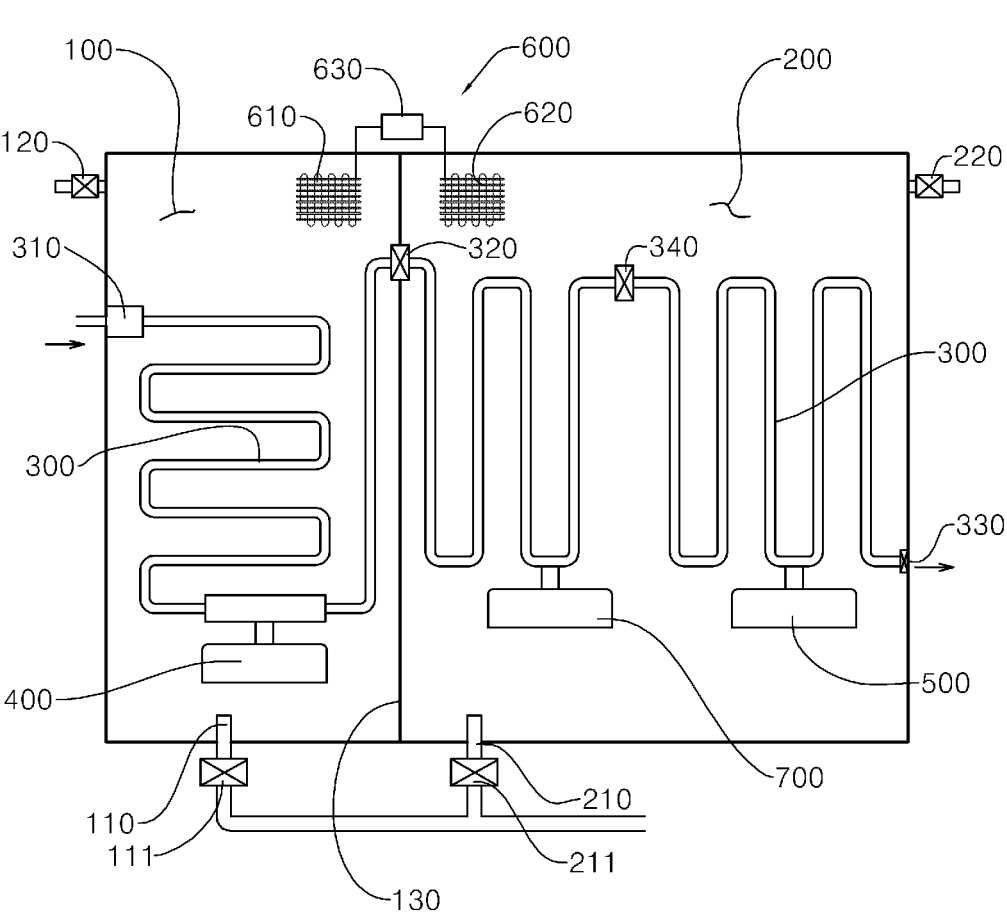
FIG. 2 is a diagram showing a second embodiment of a greenhouse gas processing device according to the present invention.

FIG. 2 shows a second embodiment of the present invention, wherein the condensation pipe 300 is further provided with a second compression means 340 between the first compression means 320 and the pressure control valve 330, and pressure control of the condensation pipe 300 located in the secondary cooling chamber 200 is performed independently.

In the second embodiment, the first section is a section between the first compression means 320 and the second compression means 340, wherein the pressure is controlled by each compression means, and nitrous oxide is condensed. The second section is a section between the second compression means 340 and the pressure control valve 330, wherein the pressure is controlled by mutual operation of the second compression means 340, the pressure control valve 330, and the third on-off valve 1100 and carbon dioxide is condensed.

If configured as described above, the secondary cooling chamber 200 liquefies nitrous oxide and carbon dioxide and collects them. Nitrous oxide exists as a liquid in the temperature range of −0.48° C. to −70° C., and carbon dioxide exists as a liquid at −56° C. to −78° C. Thus, the secondary cooling chamber 200 liquefies nitrous oxide and carbon dioxide and collects them. The air of 0° C. or higher transmitted from the primary cooling chamber 100 is cooled, and nitrous oxide contained in the air is first liquefied between the first compression means 320 and the second compression means 340 and collected, and then carbon dioxide is liquefied and collected between the second compression means 340 and the pressure control valve 330.

If configured in this way, a second liquid tank 500 may be provided in a section where carbon dioxide is condensed, and a third liquid tank 700 storing condensed nitrous oxide liquid may be further provided in a section where nitrous oxide is condensed. When configured in this way, water vapor in the first liquid tank 400, carbon dioxide in the second liquid tank 500, and nitrous oxide in the third liquid tank 700 are collected in a liquid state, respectively. Each liquid can be utilized for a purpose suitable for the characteristics of the liquid.

Figure 3:
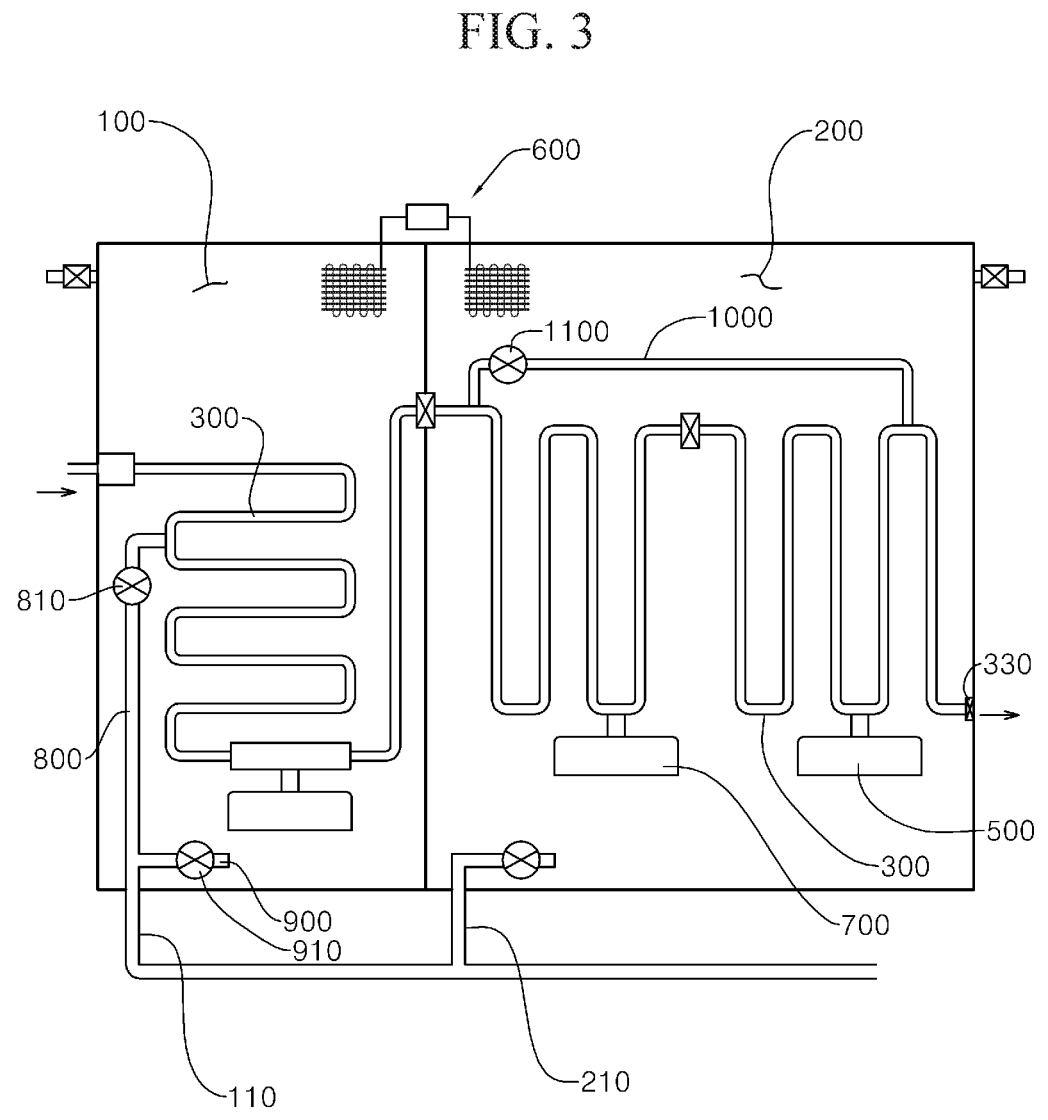

FIG. 3 shows a third embodiment of the present invention, wherein the first cold air supply pipe 110 has a shape that is branched into a first branch pipe 900 through which cold air is supplied to the internal space of the primary cooling chamber 100 and a second branch pipe 800 through which cold air is directly supplied to the condensation pipe 300. Low-temperature air is injected directly into the condensation pipe 300, so that the air can be quickly cooled to thereby reduce the overall condensation time of greenhouse gases.

Further, in the third embodiment, the air inside the condensation pipe 300 provided in the second cooling chamber 200 flows toward the pressure control valve 330 and is gradually cooled. The cold air at the end can be injected immediately after the first compression means 320 by utilizing the third cold air supply pipe 1000 and the third on-off valve 1100, thus rapidly cooling the air flowing in from the primary cooling chamber 100 and reducing the overall condensation time of greenhouse gases.

The first inlet valve 111, the first exhaust valve 120, the second inlet valve 211, the second exhaust valve 220, the pressure control valve 330, the first on-off valve 810, the second on-off valve 910, the third on-off valve 1100, the first compression means 320, and the second compression means 340 all have an opening/closing function, which are applied into a configuration such as a check valve or a one-way valve having a backflow prevention function, so that the air flow is made in one direction.

Although the present invention has been described above with reference to the embodiments, it will be apparent to those skilled in the art that various modifications can be carried out within the scope of the technical idea of the present invention.

The invention claimed is:

1. A greenhouse gas treatment apparatus comprising:
a primary cooling chamber filled with low-temperature air by means of a first cold air supply pipe;
a secondary cooling chamber, formed to have a space independent of the primary cooling chamber and filled with the low-temperature air through a second cold air supply pipe, the secondary cooling chamber being maintained at a temperature lower than that of the primary cooling chamber;
a condensation pipe through which air containing greenhouse gases is suctioned by an air-intake port and sequentially passes through the primary cooling chamber and then the secondary cooling chamber to undergo heat exchange and be discharged, wherein water vapor contained in the air condenses in the condensation pipe within the primary cooling chamber and is collected in a first liquid tank, and carbon dioxide in the air condenses in the condensation pipe within the secondary cooling chamber and is collected in a second liquid tank, and non-condensed gas is discharged through a pressure control valve at an outlet portion of the secondary cooling chamber;
a first compressor provided at an inlet region of the secondary cooling chamber along the condensation pipe;
the pressure control valve provided at the outlet portion of the secondary cooling chamber along the condensation pipe;
a second compressor disposed between the first compressor and the pressure control valve along the condensation pipe to enable independent pressure control upstream and downstream of the second compressor; and
a heat-exchanger configured to transfer heat from the secondary cooling chamber to the primary cooling chamber so that the secondary cooling chamber is maintained at a temperature lower than the primary cooling chamber,
wherein:
the primary cooling chamber and the secondary cooling chamber are respectively provided with a first exhaust valve and a second exhaust valve, and the first cold air supply pipe and the second cold air supply pipe are respectively provided with a first inlet valve and a second inlet valve, so that the temperature and pressure of the primary cooling chamber and the secondary cooling chamber are independently adjusted by opening and closing operations of each valve,
wherein:
the first cold air supply pipe is branched into a first branch pipe through which the low-temperature air is supplied to an inner space of the primary cooling chamber, and a second branch through which the low-temperature air is supplied directly to the condensation pipe.

2. The greenhouse gas treatment apparatus according to claim 1, wherein:
in the secondary cooling chamber, air at an outlet of the secondary cooling chamber can be directly mixed with air at an inlet through a third cold air supply pipe and a third on-off valve.

* * * * *